US009083252B2

(12) United States Patent
Ozalevli et al.

(10) Patent No.: US 9,083,252 B2
(45) Date of Patent: Jul. 14, 2015

(54) PRIMARY-SIDE REGULATION FOR ISOLATED POWER SUPPLIES

(71) Applicant: TEXAS INSTRUMENTS INCORPORATED, Dallas, TX (US)

(72) Inventors: Erhan Ozalevli, Dallas, TX (US); David Daniels, Dallas, TX (US); Luthuli E. Dake, McKinney, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 236 days.

(21) Appl. No.: 13/658,342

(22) Filed: Oct. 23, 2012

(65) Prior Publication Data

US 2014/0112023 A1    Apr. 24, 2014

(51) Int. Cl.
*H02M 3/335* (2006.01)
*H02M 1/00* (2007.01)

(52) U.S. Cl.
CPC .. *H02M 3/33523* (2013.01); *H02M 2001/0009* (2013.01)

(58) Field of Classification Search
CPC ............ H02M 1/14; H02M 1/15; H02M 3/00
USPC ...................... 323/282–288; 363/21.09–21.18
See application file for complete search history.

(56) References Cited

U.S. PATENT DOCUMENTS

| 4,307,441 | A | * | 12/1981 | Bello | 363/25 |
|---|---|---|---|---|---|
| 4,495,554 | A | * | 1/1985 | Simi et al. | 363/21.15 |
| 4,504,898 | A | * | 3/1985 | Pilukaitis et al. | 363/49 |
| 4,717,994 | A | * | 1/1988 | Diaz et al. | 363/17 |
| 4,885,675 | A | * | 12/1989 | Henze et al. | 363/26 |
| 5,013,933 | A | * | 5/1991 | Eisenhart | 327/331 |
| 5,233,287 | A | * | 8/1993 | Lenk | 323/268 |
| 5,355,073 | A | * | 10/1994 | Nguyen | 320/116 |
| 5,568,343 | A | * | 10/1996 | Kosugi | 361/36 |
| 6,009,000 | A | * | 12/1999 | Siri | 363/21.09 |
| 2006/0093016 | A1 | * | 5/2006 | McLeod et al. | 374/178 |

OTHER PUBLICATIONS

Jiaxin Chen; Jianguo Zhu; Youguang Guo, "Calculation of Power Loss in Output Diode of a Flyback Switching DC-DC Converter," Power Electronics and Motion Control Conference, 2006. IPEMC 2006. CES/IEEE 5th International , vol. 1, pp. 1-5; Aug. 14-16, 2006.*

\* cited by examiner

*Primary Examiner* — Harry Behm
*Assistant Examiner* — Peter Novak
(74) *Attorney, Agent, or Firm* — William B. Kempler; Frank D. Cimino

(57) ABSTRACT

A DC-DC converter includes a primary side sense circuit to detect a load current of the DC-DC converter based on reflected current from a secondary winding of the DC-DC converter to a primary winding of the DC-DC converter. A primary side diode models effects of a secondary side diode that is driven from the secondary winding of the DC-DC converter. An output correction circuit controls a switching waveform to the primary winding of the DC-DC converter based on feedback from the primary side sense circuit and the primary side diode.

20 Claims, 5 Drawing Sheets

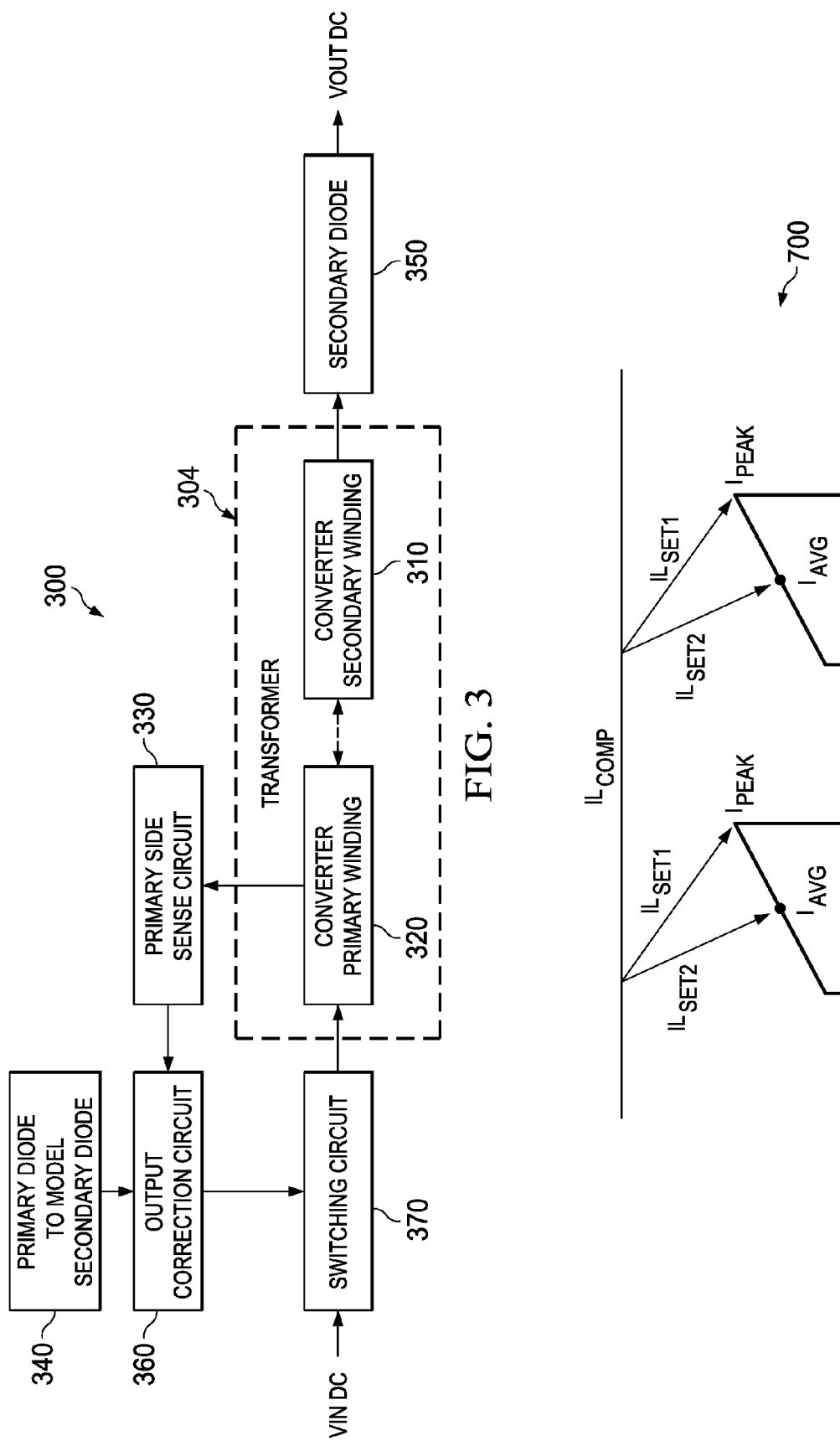

PRIMARY-SIDE REGULATION FOR ISOLATED POWER SUPPLIES

TECHNICAL FIELD

This disclosure relates to electronic circuits and particularly to power supply circuits.

BACKGROUND

Many low power isolated supplies used in e-meters, industrial controls, motor drives, and medical applications, for example, applications use an open loop power supply to power circuits on the secondary side. The outputs of the open loop power supplies are generally not regulated and do not have soft start to minimize inrush currents. These issues can be circumvented by regulating the primary-side of the supply, however. Prior art FIG. 1 shows a simplified schematic of such isolated supply 100. The power supply 100 is a variation of a Flyback converter and consists of a half bridge power stage S1 and S2, transformer T1, primary side capacitor Cr, diode D1, and output capacitor Co.

Although the supply 100 shown in FIG. 1 provides better regulation compared to open-loop systems, the regulation can improve by sensing the output changes at the secondary-side using an optocoupler 210 as shown in Prior art FIG. 2 or using a linear regulator (not shown) at the secondary-side to regulate the output even further as discussed below.

In isolated switching power supplies, optocouplers 210 are widely used to provide isolation in the feedback loop. One of the disadvantages of using optocouplers is its low bandwidth, because the bandwidth is reduced by introducing an extra pole in the control loop gain of the supply. Another disadvantage of using optocouplers is the large unit-to-unit variation in the current transfer ratio (CTR). The CTR or the coupling efficiency is defined as the ratio of opto-isolator transistor collector current to the diode current. High variation in CTR imposes constraints on control loop design for power supplies and causes the compensation of the loop to be more difficult. In addition, optocouplers are not as reliable at high temperatures, and therefore not preferred for space, military, and some industrial applications.

Instead of optocouplers, a linear regulator can regulate the output down to a desired output voltage level. This strategy helps avoiding bandwidth, process variation, and reliability concerns associated with optocouplers. Although the output can be tightly regulated with a linear regulator, it also results in efficiency loss mainly due to power dissipation across the pass element of the regulator.

SUMMARY

In one example, a DC-DC converter includes a primary side sense circuit to detect a load current of the DC-DC converter based on reflected current from a secondary winding of the DC-DC converter to a primary winding of the DC-DC converter. A primary side diode models effects of a secondary side diode that is driven from the secondary winding of the DC-DC converter. An output correction circuit controls a switching waveform to the primary winding of the DC-DC converter based on feedback from the primary side sense circuit and the primary side diode.

In another example, a DC-DC converter includes a primary side sense circuit to detect a load current of the DC-DC converter based on reflected current from a secondary winding of the DC-DC converter to a primary winding of the DC-DC converter. This includes a current source to drive a primary side diode, wherein the primary side diode models effects of a secondary side diode that is driven from the secondary winding of the DC-DC converter. An output correction circuit controls a switching waveform to the primary winding of the DC-DC converter based on feedback from the primary side sense circuit and the primary side diode.

In yet another example, an apparatus includes a primary side sense circuit to detect a load current for a DC-DC converter based on reflected current from a secondary winding of the DC-DC converter to a primary winding of the DC-DC converter. This includes a current source to drive a primary side diode, wherein the primary side diode models effects of a secondary side diode that is driven from the secondary winding of the DC-DC converter. The apparatus can also include an output correction circuit to control a switching waveform to the primary winding of the DC-DC converter based on feedback from the primary side sense circuit and the primary side diode, wherein the output correction circuit controls a voltage across the primary side diode according to a function of average load current.

BRIEF DESCRIPTION OF THE DRAWINGS

FIG. 3 illustrates an example a DC-DC converter that employs primary side regulation for the DC-DC converter.

FIG. 7 illustrates example DC-DC converter waveforms of average current calculation based on sampling for the output correction circuit depicted in FIG. 6.

DETAILED DESCRIPTION

Figure 1:
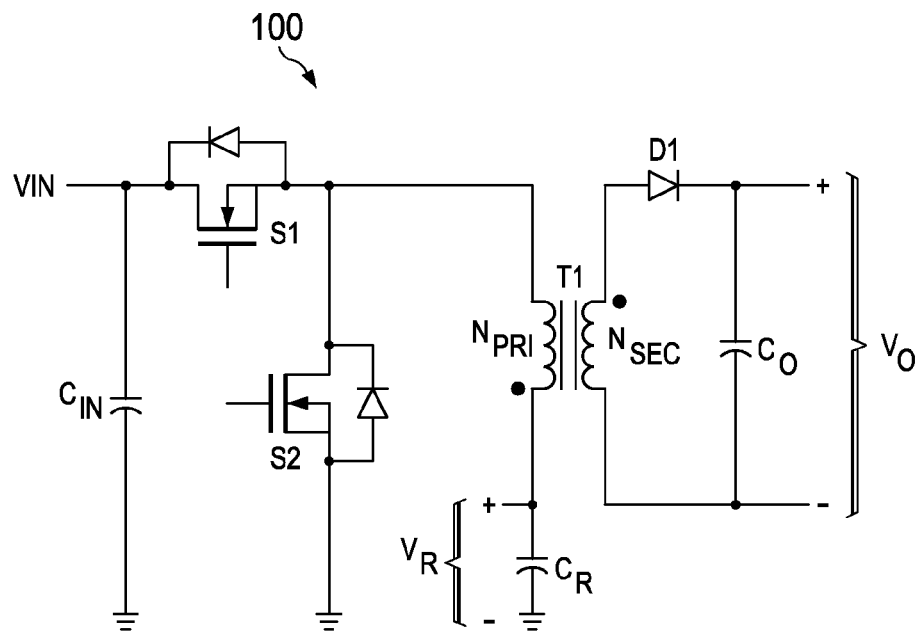
FIG. 1 illustrates an example of a prior art DC-DC converter circuit.

FIG. 3 illustrates an example DC-DC converter 300 that employs primary side regulation for the DC-DC converter. As used herein, the term DC-DC converter is used to indicate that an input DC voltage, shown as VIN DC is transformed to a subsequent DC voltage (e.g., same or different) at its output and shown as VOUT DC. In one example, the DC-DC converter 300 can be configured in a step-up voltage configuration between the DC input voltage VIN DC and the DC output voltage VOUT DC (e.g., output voltage generated higher than input voltage). In another example, a step-down voltage configuration between the DC input voltage and the DC output voltage is possible (e.g., output voltage generated lower than input voltage). In yet another configuration, an isolation configuration is provided wherein the DC input voltage is substantially the same as the DC output voltage yet some form of isolation is provided between the input voltage and the output voltage of the converter such as through a transformer as will be illustrated and described below. Other configurations for the DC-DC converter 300 can also include an impedance matching configuration wherein the output impedance of the DC-DC converter is different from the input impedance of the DC-DC converter.

The DC-DC converter 300 provides load regulation by indirectly sensing load conditions of the converter through a transformer 304. Load conditions can be monitored from converter secondary windings 310 of the transformer 304 that are reflected to converter primary windings 320 from the secondary. Such load conditions can include voltage and/or current which can be sensed via a primary side sense circuit 330 that monitors the converter primary winding 320. By employing indirect sensing of reflected conditions, no direct feedback from the secondary side is monitored by the converter 300 which improves stability of the converter 300 and reduces circuit complexity (e.g., eliminates optocoupler feedback to primary from secondary).

The primary side sense circuit 330 detects a load current of the DC-DC converter based on reflected current from a secondary winding 310 of the DC-DC converter to the primary winding of the DC-DC converter 320. A primary side diode 340 can be employed to model effects of a secondary side diode 350 that is driven from the secondary winding 310 of the DC-DC converter 300 and produces the output voltage VOUT DC. Such modeling can account for losses that are attributed to the secondary diode 350 and can thus affect load regulation. An output correction circuit 360 controls a switching waveform to the primary winding 320 of the DC-DC converter based on feedback from the primary side sense circuit 330 and the primary side diode 340. As shown, the output correction circuit 360 controls a switching circuit 370 that applies the switching waveform to the converter primary winding 320. As used herein, a diode is a generic term. Thus, any type of semiconductor or device operating as a diode can be employed (e.g., transistor configured as diode, vacuum tube, and so forth).

As noted above, the DC-DC converter 300 regulates the secondary-side of the transformer 304 without sensing the output voltage VOUT DC but instead performs primary-side output voltage correction based on load requirements. This can be achieved by sensing the delivered current to a primary side capacitor $C_r$ (not shown but connected to primary winding) and adjusting voltage $V_r$ across the capacitor such that the voltage drop across secondary diode 350 can be negated. For this operation, there are various considerations. These include determining that the load current at the primary-side is N times larger than the load current at secondary-side, wherein N is the turns ratio of the transformer 304. Therefore, the parameter N is employed to suitably configure the system 300.

Another consideration for suitable load regulation is consideration of the voltage drop across the secondary-side diode 350. Since the secondary-side of the transformer 304 is not directly sensed by the DC-DC converter 300, the voltage drop across the secondary diode 350 cannot be predicted with accuracy. However, this can be overcome by placing a similarly acting diode at the primary-side such as diode 340 to regenerate the I-V characteristic of the secondary diode 350 and based on the sensed primary-side load current. The DC-DC converter 300 can be then configured by placing a similar diode 340 on the primary-side of the transformer 304 and setting various system parameters to account for the turns ratio of the transformer 304.

The output correction method described above can be implemented by generating the voltage-drop of the diode 350 for given load current by using a small fraction of this current. This is considered since dissipating the same amount of power as the secondary diode 350 is generally not practical. Assuming the transformer 304 turns ratio is one in this example, and load current, $I_L$, can be sensed at the primary-side. If the sensed load current, $I_{LS}=I_L/k$, where k is the sense ratio, is applied to the primary diode 340 (referred to as $D_2$, in equations) then the voltage drop, $V_{D2}$, becomes as follows:

$$V_{D2} = n \times V_T \times \ln \frac{\frac{I_L}{k} + I_0}{I_0} \quad \text{Equation 1}$$

where $I_0$ is the reverse bias saturation current, n is the ideality factor describing differences from an ideal diode, and $V_T$ is the thermal voltage of the diode. The voltage $V_{D2}$ can be further simplified by subtracting $I_0$ from the sense current. Thus, $V_{D2}$ can be expressed as:

$$V_{D2} = n \times V_T \times \ln \frac{\frac{I_L}{k} - I_0 + I_0}{I_0} = n \times V_T \times \ln \frac{I_L}{k \times I_0} \quad \text{Equation 2}$$

The voltage drop across the secondary diode 350, $V_{D1}$ can be expressed as follows:

$$V_{D1} = n \times V_T \times \ln \frac{I_L + I_0}{I_0} \quad \text{Equation 3}$$

The difference between these diode voltage drops for $I_L \gg I_0$ can be then expressed as:

$$\Delta V_D = V_{D1} - V_{D2} = n \times V_T \times \ln k \quad \text{Equation 4}$$

The difference between these voltage-drops is a constant and can be calculated based on the parameter "k". In addition to using $\Delta V_D$ to find $V_{D2}$, the voltage drop due to resistance of the diode should be accounted for by placing a resistor in series with $D_2$. The value of this resistor can be calculated as follows:

$$R_{D2} = k \times R_{D1} \quad \text{Equation 5}$$

where $R_{D1}$ is the resistance of the secondary diode 350. As a result, an I-V characteristic of the secondary diode 350 can be replicated at the primary side by using following equation:

$$V_{D1} + R_{D1} \times I_L = \Delta V_D + V_{D2} + R_{D2} \times \frac{I_L}{k} = \quad \text{Equation 6}$$
$$n \times V_T \times \ln k + n \times V_T \times \ln \frac{I_L}{k \times I_0} + R_{D2} \times \frac{I_L}{k}$$

Figure 4:
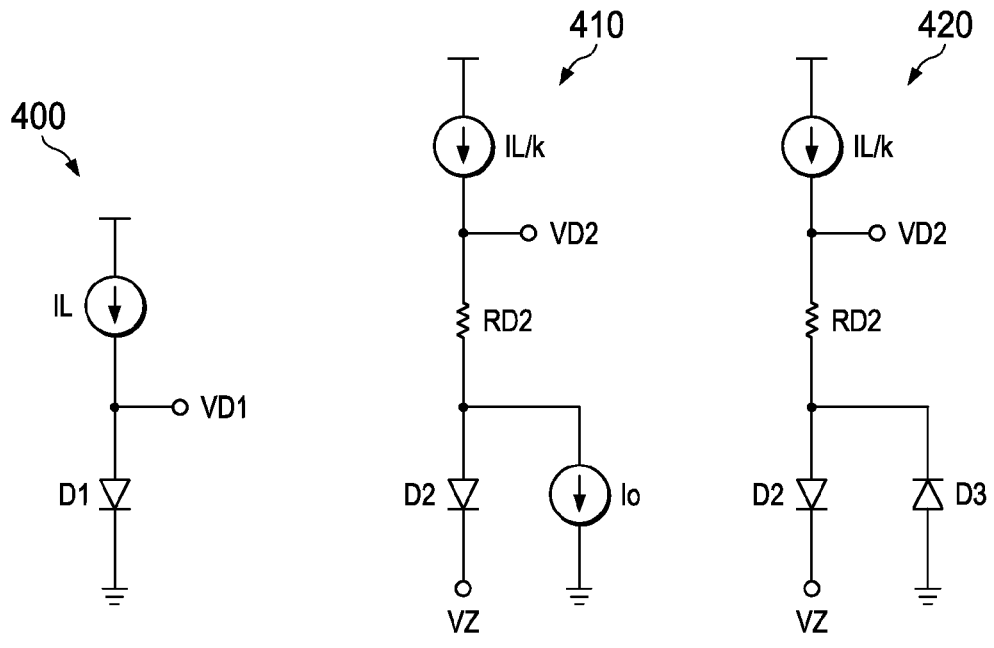
FIG. 4 illustrates example DC-DC converter diode model circuits that can be employed to compensate for secondary diode effects in the converter.
Figure 2:
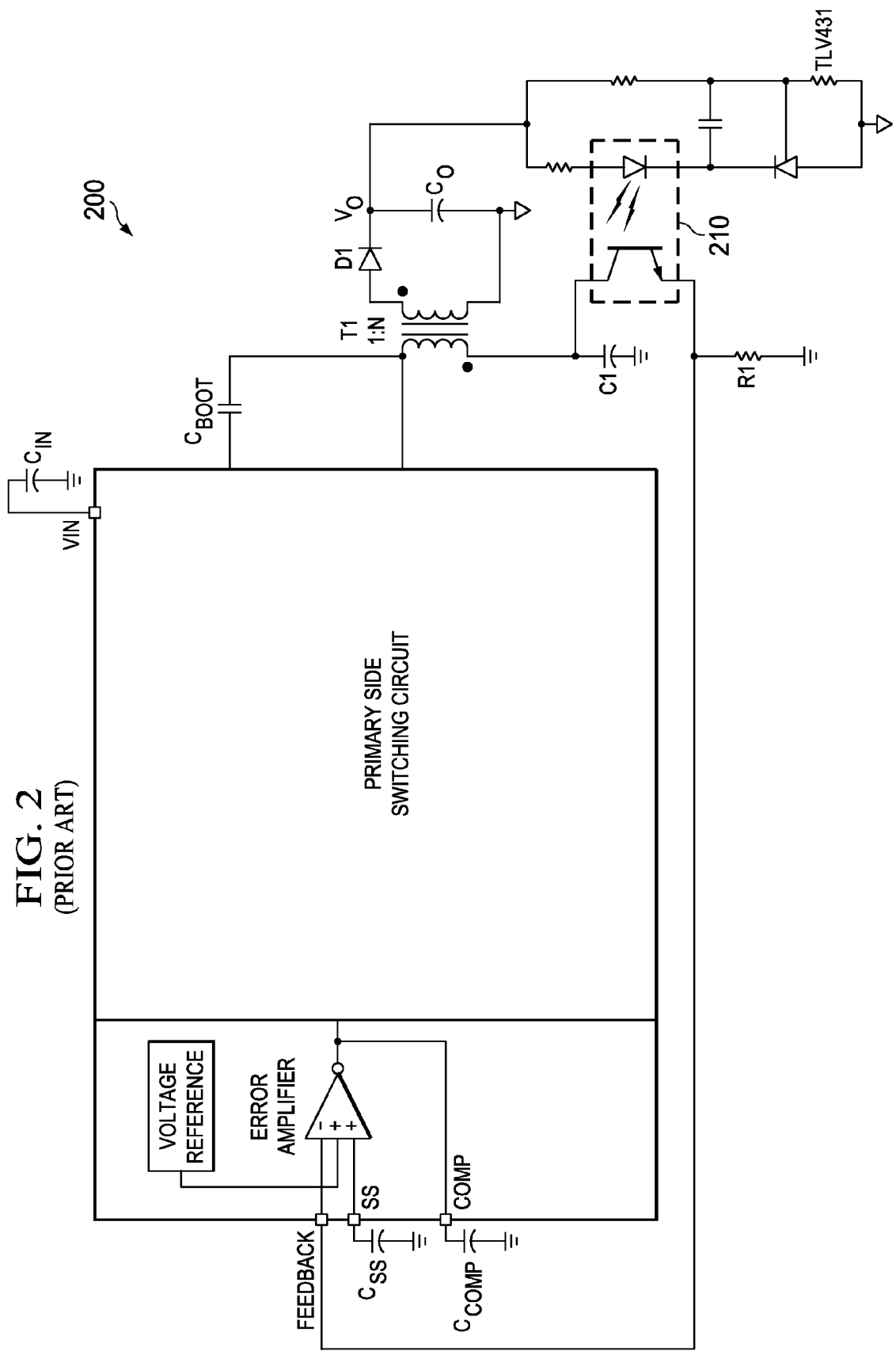
FIG. 2 illustrates an example of a prior art DC/DC converter circuit employing optocoupler feedback from secondary to primary.

FIG. 4 illustrates example DC-DC converter diode model circuits that can be employed to compensate for secondary diode effects in the converter. At 400, a circuit model of the secondary side diode and load current in the secondary is shown. At 410, a first circuit model for the primary diode is shown. At 420, an alternative circuit model is shown for the primary diode. The main difference between the first and the second methods depicted at 410 and 420 respectively, is the manner in which $I_0$ current is generated in the primary. The first method at 410 sinks constant current, which can be generated by reverse biasing $D_2$ and then sampling and holding the current through it. This current can then be periodically updated to sense the change in $I_0$. The second method at 420 generates $I_0$ by connecting a similar diode $D_3$ in reverse biased configuration with the diode $D_2$.

Figure 5:
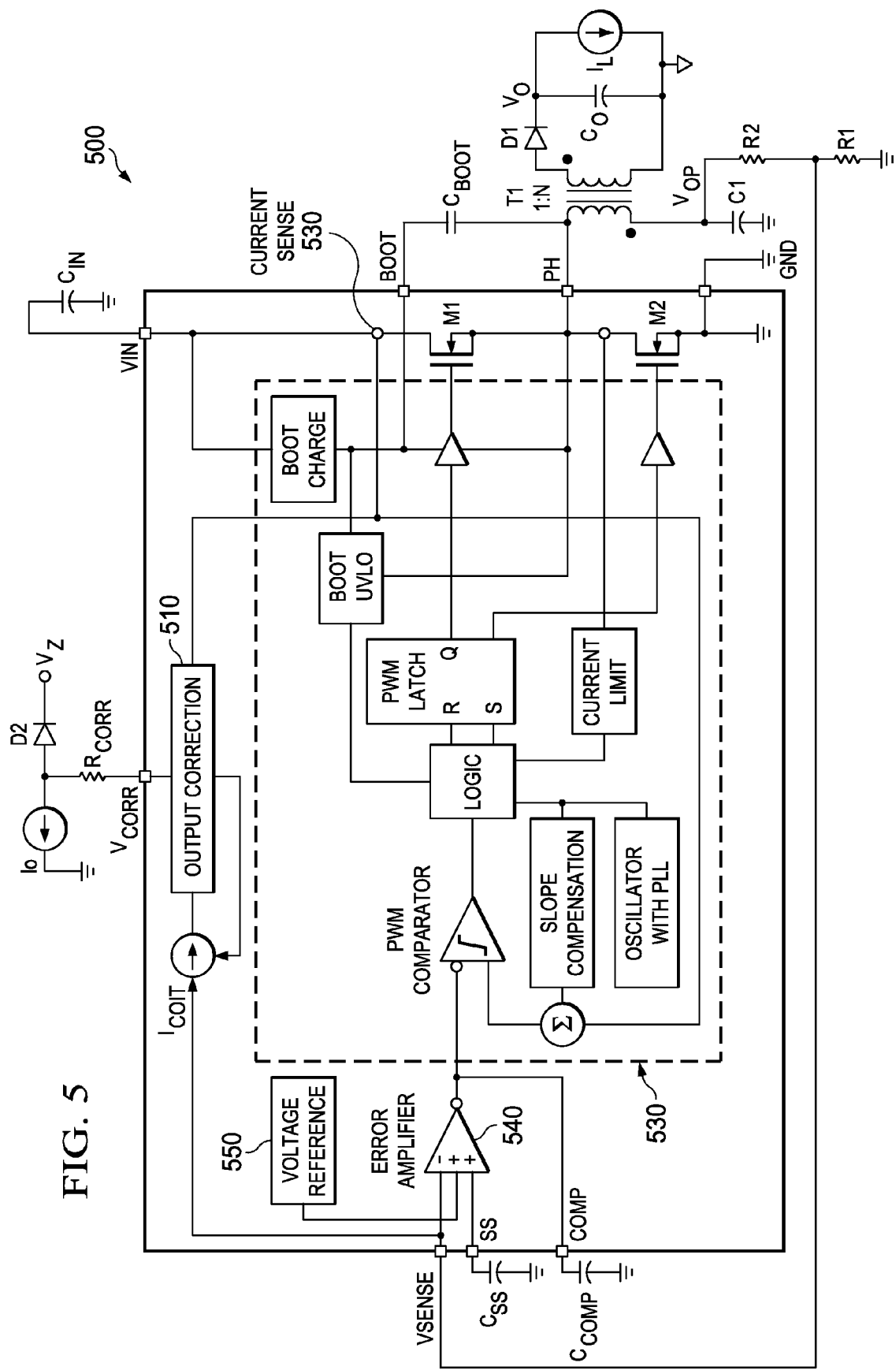
FIG. 5 illustrates a DC-DC converter circuit that is an example of the generalized converter depicted in FIG. 3.

FIG. 5 illustrates a DC-DC converter circuit 500 that is an example of the generalized converter depicted in FIG. 3. The example shown in the circuit 500 employs the diode-voltage-drop generation method described above at 420 of FIG. 4. In this example, the voltage drop across the secondary-side diode, $D_1$, is accounted for by increasing the primary-side output voltage, $V_{op}$. The amount of voltage increase in the primary-side, $\Delta V_{op}$, is calculated by referring $D_1$ voltage drop, $V_{D1}$, to the primary-side as shown below:

$$\Delta V_{op} = \frac{V_{D1}}{N} \qquad \text{Equation 7}$$

where N is the turns ratio of the transformer. The proposed method achieves generating this voltage by using the load current information. The load current on the secondary-side, $I_L$, can be similarly referred to the primary-side, $$I_{Lp} = I_L \times N \qquad \text{Equation 8}$$

where $I_{Lp}$ is the primary-side load current. Also, $V_{D1}$ can be expressed in terms of $I_L$ as follows:

$$V_{D1} = n \times V_T \times \ln \frac{I_L}{(1-D) \times I_0} \qquad \text{Equation 9}$$

where D is the duty cycle calculated based on the input voltage and primary-side output voltage.

As shown, voltage from the primary diode D2 is fed though resistor Rcorr to an output correction circuit 510 which monitors load current via primary current sense shown at 520. Switching circuit logic is shown inside dashed box 530 which is fed by an error amplifier 540. The error amplifier 540 monitors a voltage reference 550 and receives a feedback voltage from the primary winding circuit R1 and R2 which are connected to primary capacitor C1 described above with respect to FIG. 3. The example circuit 500 employs a peak current control mechanism to regulate the output. Another aspect for this example to function suitably is to use the average load current for output correction, since output correction based on peak or minimum current may be inaccurate. Such output correction utilizing average load current will be illustrated and described below with respect to FIG. 6.

Figure 6:
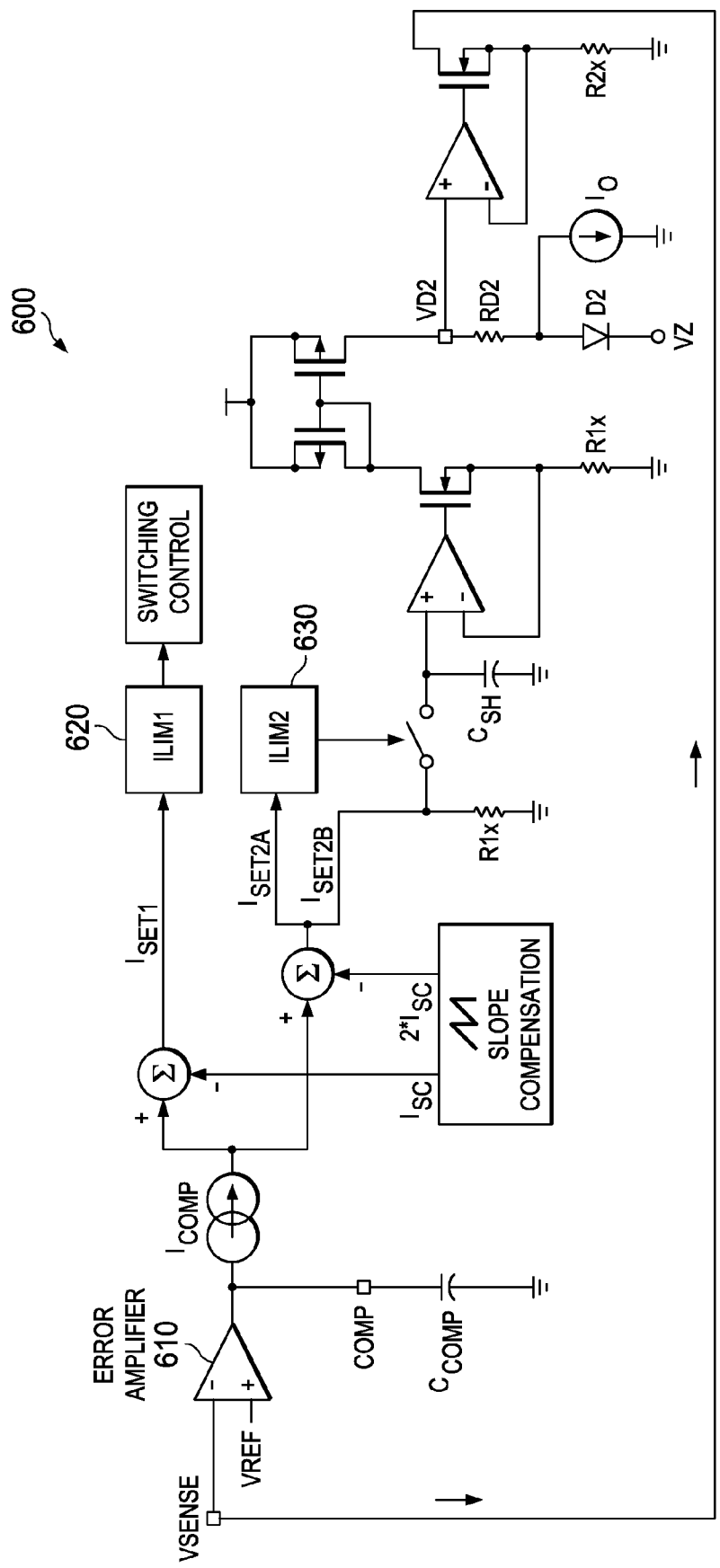
FIG. 6 illustrates an example of a DC-DC converter output correction circuit depicted in FIG. 5.

FIG. 6 illustrates an example of a DC-DC converter output correction circuit 600 and depicted in FIG. 5. A function of average current load can be sensed at the primary-side as shown in the circuit 600. In this example, $V_{SENSE}$ can be converted to $I_{comp}$ through error amplifier 610 and V-to-I converter. A slope compensation current, $I_{sc}$, is then subtracted from $I_{comp}$ to set $I_{set1}$, which is used to control the switching of a high side driver. Similarly, the copy of $I_{comp}$ is used to find the average current by subtracting $2*I_{sc}$ from it. This subtracted current, $I_{set2a}$, is used to find the intersection of sense current and the primary-side load current by using the current limit ($I_{LIM1}$) circuit 620. FIG. 7 illustrates example waveforms showing the average current detection. After the timing of average current is determined, then $I_{set2b}$, which is the copy of $I_{set2a}$, is sampled by the signal generated from a current limit ($I_{LIM2}$) circuit 630. The sampled signal is then applied to the diode to replicate the voltage drop across $D_1$. The diode voltage generated at the primary-side, $V_{D2}$, is converted to current to cause a sink from $V_{DENSE}$. As a result, the sampled $I_{set2b}$ current becomes a function of the average load current. This current can then be applied to $D_2$ and generates the voltage that can be expressed as:

$$V_{D2} = n \times V_T \times \ln \frac{I_{set2b\_sh}}{I_0} + R_{D2} \times I_{set2b\_sh} + V_z = \qquad \text{Equation 10}$$

$$n \times V_T \times \ln \frac{N \times I_L}{k \times I_0} + R_{D2} \times \frac{I_L}{k} + V_z$$

where k is the sense-FET to power-FET ratio, and $V_z$ is the constant voltage (for given temperature) that is to be generated internally and scaled externally by the user, or completely generated by the user. The external diode, $D_2$, is assumed to be similar in operations as $D_1$. The voltage $V_{D2}$ is then converted to current flowing out of feedback of the regulator to correct for the output voltage drop. As a result, $\Delta V_{op}$ can be expressed in terms of $V_{D2}$ as follows:

$$\Delta V_{op} = \frac{V_{D1}}{N} = V_{D2} \times \frac{R_2}{R_{2x}} = V_x \times M \qquad \text{Equation 11}$$

where $R_{2x}$ is the fixed internal resistor, and $R_2$ is the feedback resistor used to set the primary output voltage. Then, applying $V_{D1}$ and $V_{D2}$ equations to the following Equation 12:

$$\Delta V_{op} = \frac{n \times V_T}{N} \times \ln \frac{I_L}{(1-D) \times I_0} + \frac{R_{D1}}{N} \times \frac{I_L}{(1-D)} =$$

$$M \times \left( n \times V_T \times \ln \frac{N \times I_L}{k \times I_0} + V_z + R_{D2} \times \frac{I_L}{k} \right)$$

In order to equate both sides, M should be equal to 1/N, and $R_{D2}$ should be equal to a function of $R_{D1}$ as shown below:

$$R_{D2} = \frac{R_{D1}}{N} \times \frac{k}{1-D} \qquad \text{Equation 13}$$

As a result, $V_z$ can be expressed as:

$$V_z = n \times V_T \times \ln \frac{k}{(1-D) \times N} \qquad \text{Equation 14}$$

Based on the ratios, N and k, a voltage can be set at the cathode side of $D_2$. The parameter k can be provided as a design parameter and provided to the user (e.g., k can be determined during manufacturing and testing of DC-DC converter chip).

Alternatively, $n \times V_T \times \ln k$ can be generated internally, and an external resistor can be used to scale this voltage. Also, $R_2$ (upper feedback resistor) can be calculated by using M and $R_{2x}$ as follows:

$$R_2 = \frac{R_{2x}}{N} \qquad \text{Equation 15}$$

After $R_2$ and $V_z$ are set based on parameters, k and $R_{2x}$, the output correction voltage becomes about equal to $$\Delta V_{op} = \frac{V_{D1}}{N}.$$

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A DC-DC converter, comprising:
   a primary side sense circuit to directly detect a load current of the DC-DC converter based on reflected current from a secondary winding of the DC-DC converter to a primary winding of the DC-DC converter;
   a primary side diode of a same type as a secondary diode to model effects of the secondary side diode that is driven from the secondary winding of the DC-DC converter; and
   an output correction circuit to control a switching waveform to the primary winding of the DC-DC converter based on feedback from the primary side sense circuit and the primary side diode.

2. The DC-DC converter of claim 1, further comprising a switching circuit to generate the switching waveform and drive the primary winding of the DC-DC converter.

3. The DC-DC converter of claim 1, further comprising a primary side current source to drive the primary side diode, wherein the primary side current source provides a current that is based on portion of load current that is reduced in scale by a turns ratio defined by the primary winding and the secondary winding.

4. The DC-DC converter of claim 3, wherein the primary diode is in series with a resistor and the primary side current source to adjust the voltage across the primary side diode.

5. The DC-DC converter of claim 4, further comprising a second current source in parallel to the primary side diode to further adjust the voltage across the primary side diode.

6. The DC-DC converter of claim 4, further comprising a second diode in parallel to the primary side diode to further adjust the voltage across the primary side diode.

7. The DC-DC converter of claim 4, wherein the primary side current source employs an ideality factor n describing differences from an ideal diode which describes an ideal characteristic of a diode to adjust the voltage across the primary side diode.

8. The DC-DC converter of claim 7, wherein the primary side current source employs a thermal factor voltage VT which describes temperature characteristics of a diode to adjust the voltage across the primary side diode.

9. The DC-DC converter of claim 1, wherein the output correction circuit employs a peak current control to regulate the output voltage of the DC-DC converter.

10. The DC-DC converter of claim 9, wherein the output correction circuit senses a voltage from the primary winding and converts the sensed voltage to a compensation current for a switching circuit in the DC-DC converter that adjusts the voltage across the primary side diode.

11. The DC-DC converter of claim 1, wherein the output correction circuit employs an average current control to regulate the output voltage of the DC-DC converter.

12. A DC-DC converter, comprising:
    a primary side sense circuit to directly detect a load current of the DC-DC converter based on reflected current from a secondary winding of the DC-DC converter to a primary winding of the DC-DC converter;
    a current source to drive a primary side diode of the same type as a secondary diode, wherein the primary side diode models effects of the secondary side diode that is driven from the secondary winding of the DC-DC converter; and
    an output correction circuit to control a switching waveform to the primary winding of the DC-DC converter based on feedback from the primary side sense circuit and the primary side diode.

13. The DC-DC converter of claim 12, wherein the primary diode is in series with a resistor and the current source to adjust the voltage across the primary side diode.

14. The DC-DC converter of claim 13, further comprising a second current source in parallel to the primary side diode to further adjust the voltage across the primary side diode.

15. The DC-DC converter of claim 13, further comprising a second diode in parallel to the primary side diode to further adjust the voltage across the primary side diode.

16. The DC-DC converter of claim 13, further comprising a slope compensation circuit to adjust the voltage across the primary side diode.

17. The DC-DC converter of claim 12, further comprising a switching circuit to generate the switching waveform in the DC-DC converter.

18. An apparatus, comprising:
    a primary side sense circuit to directly detect a load current of the DC-DC converter based on reflected current from a secondary winding of the DC-DC converter to a primary winding of the DC-DC converter;
    a current source to drive a primary side diode of a same type as a secondary diode, wherein the primary side diode models effects of the secondary side diode that is driven from the secondary winding of the DC-DC converter; and
    an output correction circuit to control a switching waveform to the primary winding of the DC-DC converter based on feedback from the primary side sense circuit and the primary side diode, wherein the output correction circuit controls a voltage across the primary side diode according to a function of average load current.

19. The apparatus of claim 18, further comprising a second current source in parallel to the primary side diode to adjust the voltage across the primary side diode.

20. The apparatus of claim 18, further comprising further comprising a second diode in parallel to the primary side diode to adjust the voltage across the primary side diode.

* * * * *